(12) United States Patent
Sadowski et al.

(10) Patent No.: US 12,393,256 B2
(45) Date of Patent: Aug. 19, 2025

(54) POWER MANAGEMENT ADVISOR TO SUPPORT POWER MANAGEMENT CONTROL

(71) Applicant: ADVANCED MICRO DEVICES, INC., Santa Clara, CA (US)

(72) Inventors: Greg Sadowski, Boxborough, MA (US); Ying Chen, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/687,217

(22) Filed: Mar. 4, 2022

(65) Prior Publication Data

US 2022/0187901 A1   Jun. 16, 2022

Related U.S. Application Data (63) Continuation of application No. 16/115,420, filed on Aug. 28, 2018, now Pat. No. 11,275,430.

(51) Int. Cl.
| | |
|---|---|
| *G06F 1/32* | (2019.01) |
| *G06F 1/3287* | (2019.01) |
| *G06F 1/3296* | (2019.01) |
| *G06F 9/50* | (2006.01) |

(52) U.S. Cl.
CPC .......... *G06F 1/3296* (2013.01); *G06F 1/3287* (2013.01); *G06F 9/5094* (2013.01)

(58) Field of Classification Search
None
See application file for complete search history.

(56) References Cited

U.S. PATENT DOCUMENTS

| | | | |
|---|---|---|---|
| 9,442,668 B1 * | 9/2016 | Adams | G06F 1/3268 |
| 2008/0177686 A1 | 7/2008 | Buyuktsosunoglu et al. | |
| 2008/0201591 A1 | 8/2008 | Hu et al. | |

(Continued)

FOREIGN PATENT DOCUMENTS

| | | |
|---|---|---|
| CN | 104011625 | 8/2014 |
| CN | 104871114 | 8/2015 |

(Continued)

OTHER PUBLICATIONS

Extended European Search Report mailed May 9, 2022 for European Application No. 19854246.6, 9 pages.

(Continued)

*Primary Examiner* — Fahmida Rahman (57) ABSTRACT

An apparatus includes a plurality of registers to store sets of state information that represent a state history of a processing unit. The apparatus also includes a power management advisor (PMA) to generate a signal based on the sets of state information, wherein the signal indicates a probability that a power state transition of the processing unit achieves a target outcome. In some cases, the signal is provided to a power management controller including hardware circuitry that initiates a power state transition of the processing unit based on the signal and inputs to the power management controller that represent a subset of the state information corresponding to a current power state of the processing unit.

20 Claims, 6 Drawing Sheets

(56) References Cited

U.S. PATENT DOCUMENTS

| | | | |
|---|---|---|---|
| 2010/0042304 A1* | 2/2010 | Naik | B60W 10/26 |
| | | | 701/70 |
| 2014/0125619 A1* | 5/2014 | Panther | A61B 5/6838 |
| | | | 345/173 |
| 2014/0181555 A1 | 6/2014 | Bodas et al. | |
| 2015/0198991 A1 | 7/2015 | Bircher et al. | |
| 2016/0077575 A1 | 3/2016 | Paul et al. | |
| 2017/0185139 A1 | 6/2017 | Zwerg et al. | |
| 2017/0364132 A1 | 12/2017 | Gendler et al. | |

FOREIGN PATENT DOCUMENTS

| | | |
|---|---|---|
| JP | H08-087383 | 4/1996 |
| JP | 2008097098 | 4/2008 |
| KR | 10-2017-0080087 | 7/2017 |

OTHER PUBLICATIONS

Office Action mailed Nov. 3, 2022 for Indian Application No. 202117007786), 6 pages.
Japanese Office Action mailed Sep. 5, 2023 in Application No. 2021-510350, 3 pages.
Office Action mailed Jan. 11, 2024 in Chinese Application No. 201980056458.X, 14 pages.
Office Action mailed May 14, 2024 in Korean Application No. 10-2021-7007315, 11 pages.

\* cited by examiner

POWER MANAGEMENT ADVISOR TO SUPPORT POWER MANAGEMENT CONTROL

CROSS-REFERENCE TO RELATED APPLICATIONS

The present application is a Continuation application of U.S. patent application Ser. No. 16/115,420, entitled "POWER MANAGEMENT ADVISOR TO SUPPORT POWER MANAGEMENT CONTROL", and filed on Aug. 28, 2018, the entirety of which is incorporated by reference herein.

BACKGROUND

Processing units such as central processing units (CPUs), graphics processing units (GPUs), and accelerated processing units (APUs) can improve performance or conserve power by transitioning between different power management states. For example, a processing unit can conserve power by idling when there are no instructions to be executed by the processing unit. If the processing unit is idle for a relatively long time, power supplied to the processing unit may then be gated so that no current is supplied to the processing unit, thereby reducing stand-by and leakage power consumption. For example, a processor core in a CPU can be power gated if the processor core has been idle for more than a predetermined time interval. However, power management techniques that change the power management state of a processing unit can consume a large amount of system resources relative to the resources conserved by the state change. For example, power gating a processor core requires flushing caches in the processor core and saving the information that defines the state of the processor core, which consumes both time and power. Transitions from low power states (such as idle or power gated states) to active states exacts a performance cost to return the processor core to the active state, such as when the saved state information must be copied back into registers in the processor core.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Power management controllers in processing units are implemented as reactive controllers that decide whether to change the power state of a processing unit based on a current state and without regard to a state history of the processing unit. A conventional power management controller monitors the activity in compute units of a GPU, values of the power consumed in the GPU, values of the current drawn by the GPU, temperatures, and other state information to decide whether to change a power state by modifying clock frequencies or voltages supplied to the component. For example, power state transitions can be predicted using a Markov chain model, which is a stochastic model describing a sequence of possible events in which the probability of each event depends only on the state attained in the previous event. Conventional power management controllers make incorrect decisions in some circumstances, e.g., by triggering a power state transition that incurs a significant performance cost or increase in energy usage without generating a corresponding power savings or performance gain.

FIGS. 1-6 disclose a power management advisor that supports a conventional, local, power management controller in a processing unit. The power management advisor generates a signal (referred to herein as "advice") based on a current state of the processing unit and one or more prior states of the processing unit. The advice indicates a probability that a power state transition determined by the local power management controller achieves a target outcome, e.g., performance gains or power savings resulting from the power state transition exceed the cost of the power state transition. In some embodiments, the current and prior states are defined by the corresponding power state, values of performance counters, characteristics of instructions or draw call commands that are queued for execution in the processing unit, inputs to the local power management controller, decisions made by the local power management controller, application type, application hints, and the advice generated by the power management advisor. The power management advisor determines a value of the advice by comparing sequences of state information represented by the current and prior states of the processing unit with prior outcomes of corresponding power state transitions triggered by the power management controller. In some embodiments, the prior outcomes indicate whether performance gains or power savings from prior power state transitions exceeded the corresponding performance costs or energy usage increase.

Some embodiments of the power management advisor implement a neural network that generates probabilities indicating which of the available power states is the next power state based on sequences of current and previous states of the processing unit. The probability indicates a likelihood that a power state transition of the processing unit to each of the available power states achieve the target outcome, e.g., performance gains or power savings exceed the corresponding performance costs or energy usage increase. The neural network can be trained using a training dataset generated with simulations or on-the-fly feedback that indicates the effectiveness of a previous power state change. The power management advisor can also implement a state machine that indicates weights that are applied to the advice generated by the power management advisor and the decision made by the local power management controller. Some embodiments of the local power management controller apply the weights to the advice and the decision to determine the next power state.

Figure 1:
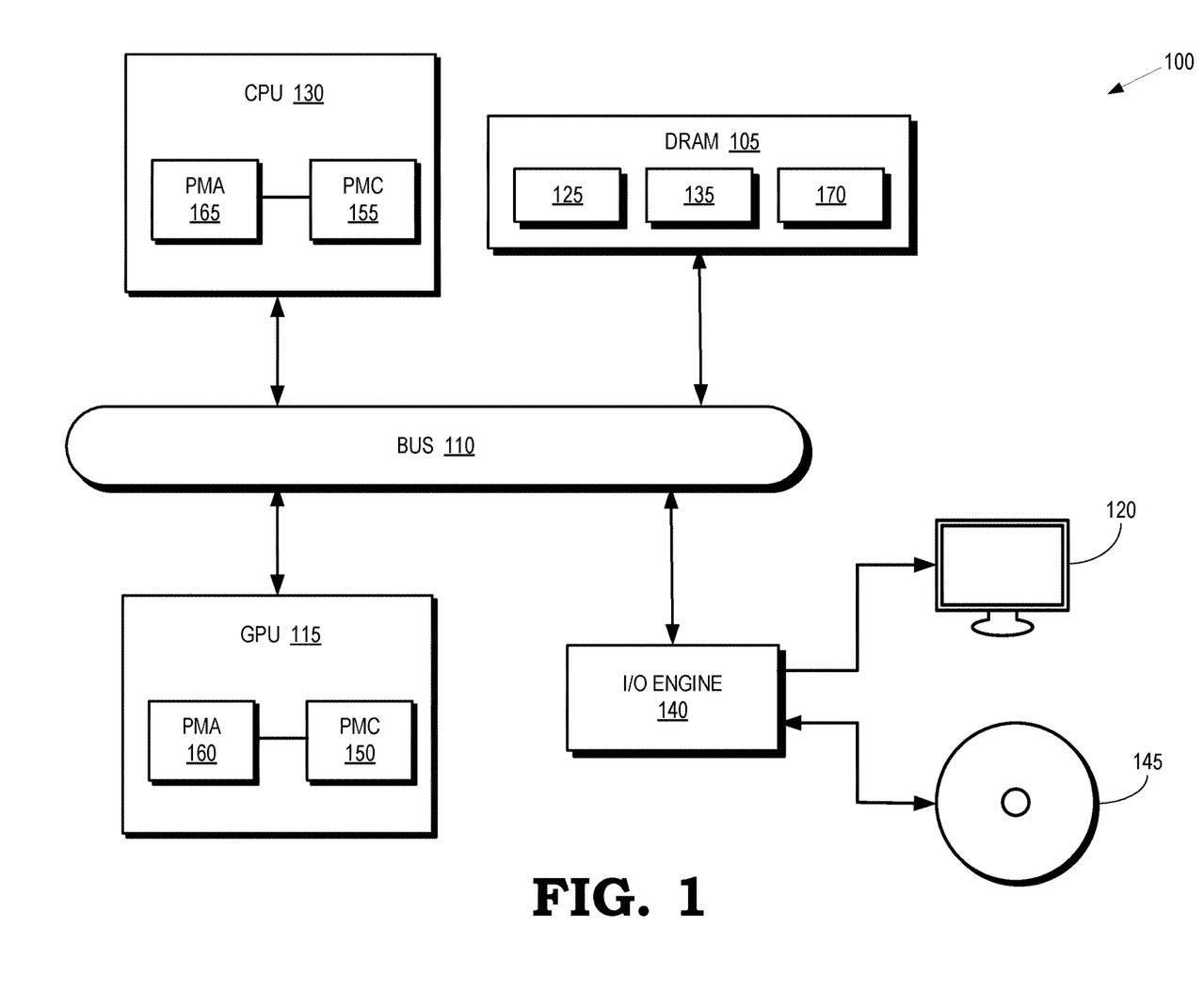
FIG. 1 is a block diagram of a processing device in accordance with some embodiments.

FIG. 1 is a block diagram of a processing device 100 in accordance with some embodiments. The processing system 100 includes or has access to a memory 105 or other storage component that is implemented using a non-transitory computer readable medium such as a Dynamic Random Access Memory (DRAM). However, the memory 105 can also be implemented using other types of memory including Static Random Access Memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements (not shown in FIG. 1 in the interest of clarity) that are configured to execute instructions concurrently or in parallel. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 125 of instructions from a program code that is to be executed by the GPU 115.

The processing system 100 also includes a central processing unit (CPU) 130 that is connected to the bus 110 and can therefore communicate with the GPU 115 and the memory 105 via the bus 110. The CPU 130 can execute instructions such as program code 135 stored in the memory 105 and the CPU 130 can store information in the memory 105 such as the results of the executed instructions. The CPU 130 is also able to initiate graphics processing by issuing draw calls to the GPU 115.

An input/output (I/O) engine 140 handles input or output operations associated with the display 120, as well as other elements of the processing system 100 such as keyboards, mice, printers, external disks, and the like. The I/O engine 140 is coupled to the bus 110 so that the I/O engine 140 can communicate with the memory 105, the GPU 115, or the CPU 130. In the illustrated embodiment, the I/O engine 140 is configured to read information stored on an external storage component 145, which is implemented using a non-transitory computer readable medium such as a compact disk (CD), a digital video disc (DVD), and the like. The I/O engine 140 can also write information to the external storage component 145, such as the results of processing by the GPU 115 or the CPU 130.

Some embodiments of the GPU 115 implement a power management controller (PMC) 150 that carries out power management policies such as policies provided by an operating system (OS) implemented in the CPU 130. The PMC 150 can also be referred to as (or implemented as part of) a system management unit. Some embodiments of the PMC 150 manage thermal and power conditions in the GPU 115 according to policies set by the OS and using information provided to the PMC 150, such as power consumption by entities within the GPU 115 or temperatures at different locations within the GPU 115. The PMC 150 controls the power states of the GPU 115, e.g., by changing an operating frequency or an operating voltage supplied to the GPU 115 or compute units implemented in the GPU 115. Some embodiments of the CPU 130 also implement a separate PMC 155 to control the power states of the CPU 130.

The PMC 150 initiates power state transitions between power management states of the GPU 115 to conserve power, enhance performance, or achieve other target outcomes. Power management states can include an active state, an idle state, a power-gated state, and some other states that consume different amount of power. For example, the power states of the GPU 115 can include an operating state, a halt state, a stopped clock state, a sleep state with all internal clocks stopped, a sleep state with reduced voltage, and a power down state. Additional power states are also available in some embodiments and are defined by different combinations of clock frequencies, clock stoppages, and supplied voltages.

The PMC 150 determines whether to initiate transitions between the power management states by comparing the performance or power costs of the transition with the performance gains or power savings of the transition. For example, the PMC 150 can apply a Markov chain model to determine whether to transition between power states based on a current state of the GPU 115. However, the PMC 150 only uses local information about the current state of the GPU 115 to decide whether to initiate the power state transition. The PMC 150 does not utilize any state history, e.g., any knowledge of previous states of the GPU 115, to initiate power state transitions. For example, a Markov chain model determines the probability of a transition from one power state to another based only on the state attained in a previous power state transition.

Although power state transitions are performed to achieve a target outcome, such as improving performance or reducing power consumption, power state transitions also incur corresponding costs such as performance decrease or a temporary power consumption increase. For example, transitioning from a low clock frequency state to a higher clock frequency state is expected to improve performance at the cost of increased power consumption. For example, powering down the GPU 115 to conserve power also requires flushing caches used by the GPU 115, as well as restoring some caches when the GPU 115 is powered up again. At least in part due to the requirement that power state transitions are initiated based only on local information, the PMC 150 makes incorrect decisions in some circumstances, e.g., by triggering a power state transition that incurs a significant performance cost or increase in energy usage without generating a corresponding power savings or performance gain.

The GPU 115 includes a power management advisor (PMA) 160 that supports the operation of the PMC 150 by generating a signal (referred to herein as "advice") that indicates the probabilities of a power state transition to achieve a target outcome. The PMA 160 is subordinate to the GPU 115. As used herein, the term "subordinate" indicates that the PMA 160 operates under the control of the GPU 115, e.g., in response to instructions or signaling from the GPU 115. Moreover, signals generated by the PMA 160 are provided to the GPU 115 and do not pass through intermediate devices such as the bus 110. In the illustrated embodiment, the PMA 160 is integrated into the GPU 115. However, some embodiments of the PMA 160 are implemented external to the GPU 115 and interconnected with the GPU 115 using wires, traces, or other connections. Implementing the PMA 160 subordinate to the GPU 115 significantly reduces the latency of signals exchanged between the PMA 160 and the GPU 115, e.g., relative to signals exchanged between the GPU 115 and the CPU 130 via the bus 110.

The PMA 160 generates advice based on state information for a current state of the GPU 115 and one or more prior states of the GPU 115. In some embodiments, the PMA 160 includes or has access to a set of registers that are used to store corresponding sets of power state information for the current and prior states that represent a state history of the GPU 115. The advice is provided to the PMC 150, which uses the advice in conjunction with its own prediction of the power state transition to determine whether to initiate a power state transition and, if so, the subsequent power state. Some embodiments of the CPU 130 also implement a PMA 165 that supports the operation of the PMC 155 by generating advice based on a state history of the CPU 130. The PMA 165 is subordinate to the CPU 130.

Some embodiments of the PMA 160 or the PMA 165 are implemented using an artificial neural network, as discussed herein. The artificial neural network, which can be implemented as a recurrent neural network or a residual neural network or other type of reinforcement learning structure, is represented as program code 170 that is configured using a corresponding set of parameters. The artificial neural network can therefore be executed on the GPU 115 or the CPU 130, or other processing units including field programmable gate arrays (FPGA), application-specific integrated circuits (ASIC), processing in memory (PIM), and the like. If the artificial neural network implements a known function that can be trained using a corresponding known dataset, the artificial neural network is trained (i.e., the values of the parameters that define the artificial neural network are established) by providing input values of the known training data set to the artificial neural network executing on the GPU 115 or the CPU 130 and then comparing the output values of the artificial neural network to labeled output values in the known training data set. Error values are determined based on the comparison and back propagated to modify the values of the parameters that define the artificial neural network. This process is iterated until the values of the parameters satisfy a convergence criterion.

In some embodiments, the CPU 130 implements an additional software advisor that supplements the advice provided to the PMC 150 by the PMA 160 associated with the GPU 115. For example, the CPU 130 can implement an additional neural network that is able to estimate the effectiveness of predict power state transitions. Due to the additional processing power of the CPU 130, the additional advisor considers longer state histories, more state information, or combinations thereof to determine whether a predicted power state transition is likely to achieve the target outcome. The additional advisor can also be implemented externally to the processing system 100, e.g., on a cloud system that communicates with the processing system 100.

Figure 2:
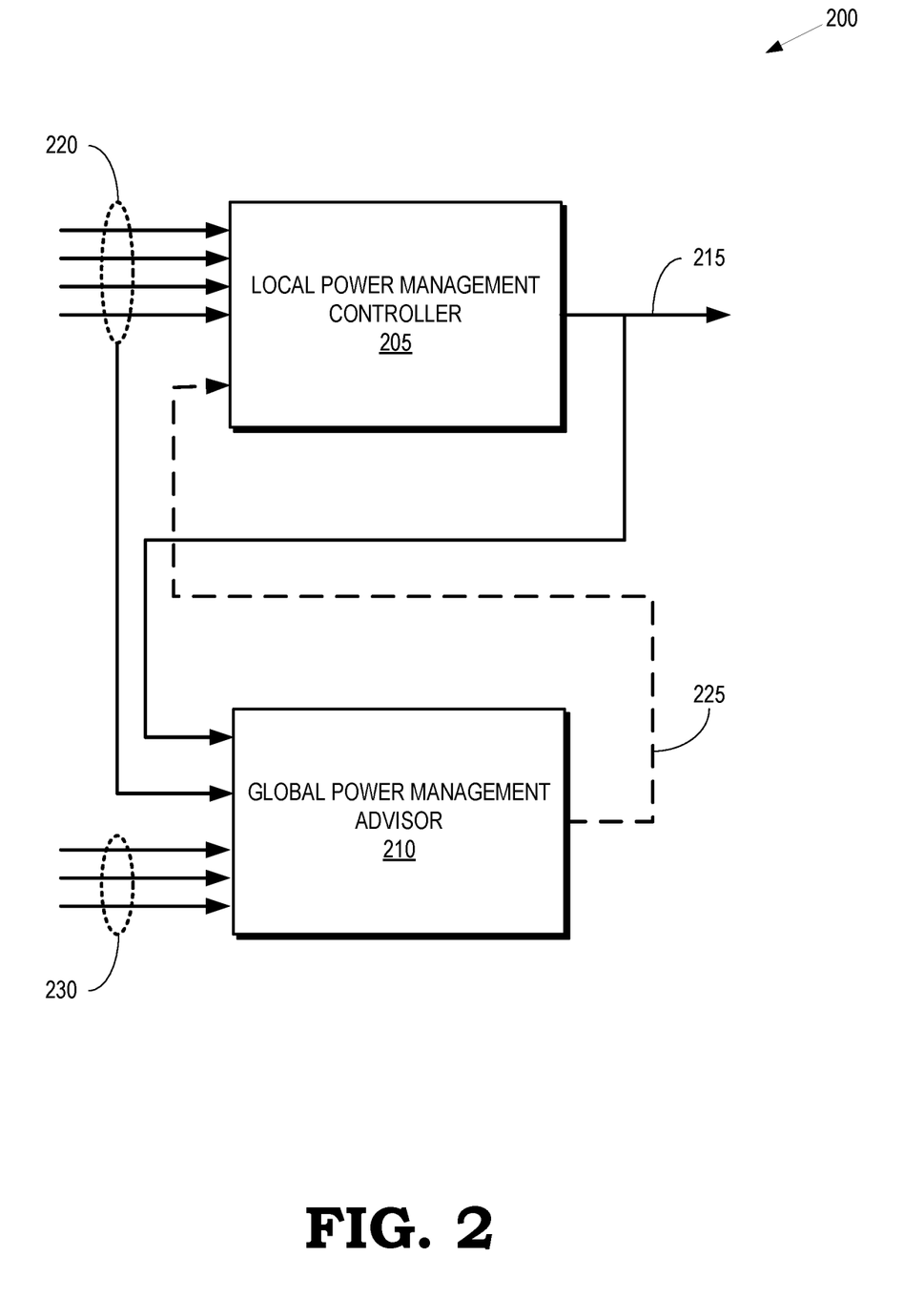
FIG. 2 is a block diagram of a power management system according to some embodiments.

FIG. 2 is a block diagram of a power management system 200 according to some embodiments. The power management system 200 includes a power management controller 205 and a power management advisor 210 that are used to implement some embodiments of the PMC 150, 155 and the PMA 160, 165 shown in FIG. 1.

The power management controller 205 is referred to as a local power management controller 205 because the power management controller 205 generates a signal 215 that represents a subsequent power state based on "local" information corresponding to the current power state of the processing unit that implements the power management system 200. The local information includes information indicating one or more temperatures in the processing unit, power consumed by the processing unit, current drawn by the processing unit, and other activities. The local information is provided as the inputs 220. The power management controller 205 does not consider any previous state information associated with the power state history of the processing unit. For example, the power management controller 205 can implement a Markov chain model to determine the signal 215 based on the current state of the processing unit.

The power management advisor 210 is referred to as a global power management advisor 210 because the power management advisor 210 generates advice 225 that indicates one or more probabilities that one or more state transitions of the processing unit achieve a target outcome. For example, if a target outcome is increased performance and the processing unit has a plurality of available power states, the advice 225 indicates probabilities that transitions to each of the available power states achieve the target increase in performance. As discussed herein, other target outcomes such as decreased power consumption or combinations of target outcomes can also be used. The power management advisor 210 generates the advice 225 based on global information that characterizes a state of the processing unit and a state history of the processing unit. Thus, the power management advisor 210 receives the same inputs 220 as the local power management controller 225, as well as additional inputs 230 including additional global state information that characterizes the current state of the processing unit and information that characterizes the state history of the processing unit. The information characterizing the current and prior states of the processing unit includes, but is not limited to, a power state of the processing unit, values of performance counters implemented in the processing unit, characteristics of instructions or draw call commands that are queued for execution in the processing unit, the input 220 to the power management controller 205 that determines whether to initiate a power state transition of the processing unit, information indicating decisions made by the power management controller such as the signal 215, a type of an application executing on the processing unit, hints provided by the application, and signals generated by the power management advisor 210 for previous states of the processing unit.

The advice 225 generated by the global power management advisor 210 is provided as an additional input to the power management controller 205, which uses the advice 225 in conjunction with the inputs 220 to generate the signal 215 indicating a subsequent power state of the processing unit. Some embodiments of the power management controller 205 generate a prediction of a subsequent power state based on the inputs 220. The power management controller 205 then accepts the prediction, or rejects the prediction and generates a new prediction, based on the advice 225. For example, if the power management controller 205 predicts that a transition to an idle state will conserve power, but the advice 225 indicates that previous transitions from the current state to the idle state did not result in a net conservation of power, the power management controller 205 can reject the prediction and maintain the processing unit in its current active state. For another example, if the advice 225 indicates that there is at least a 50% probability that a state change will not achieve the target outcome, the power management controller 205 rejects the prediction. Some embodiments of the power management advisor 210 include a state machine that indicates weights that are applied to the prediction made by the power management controller 205 and the advice 225. The weights are conveyed to the power management controller 205 via the signal 225. The power management controller 205 uses the weights to determine whether to initiate the power state transition of the processing unit, as discussed below.

Figure 3:
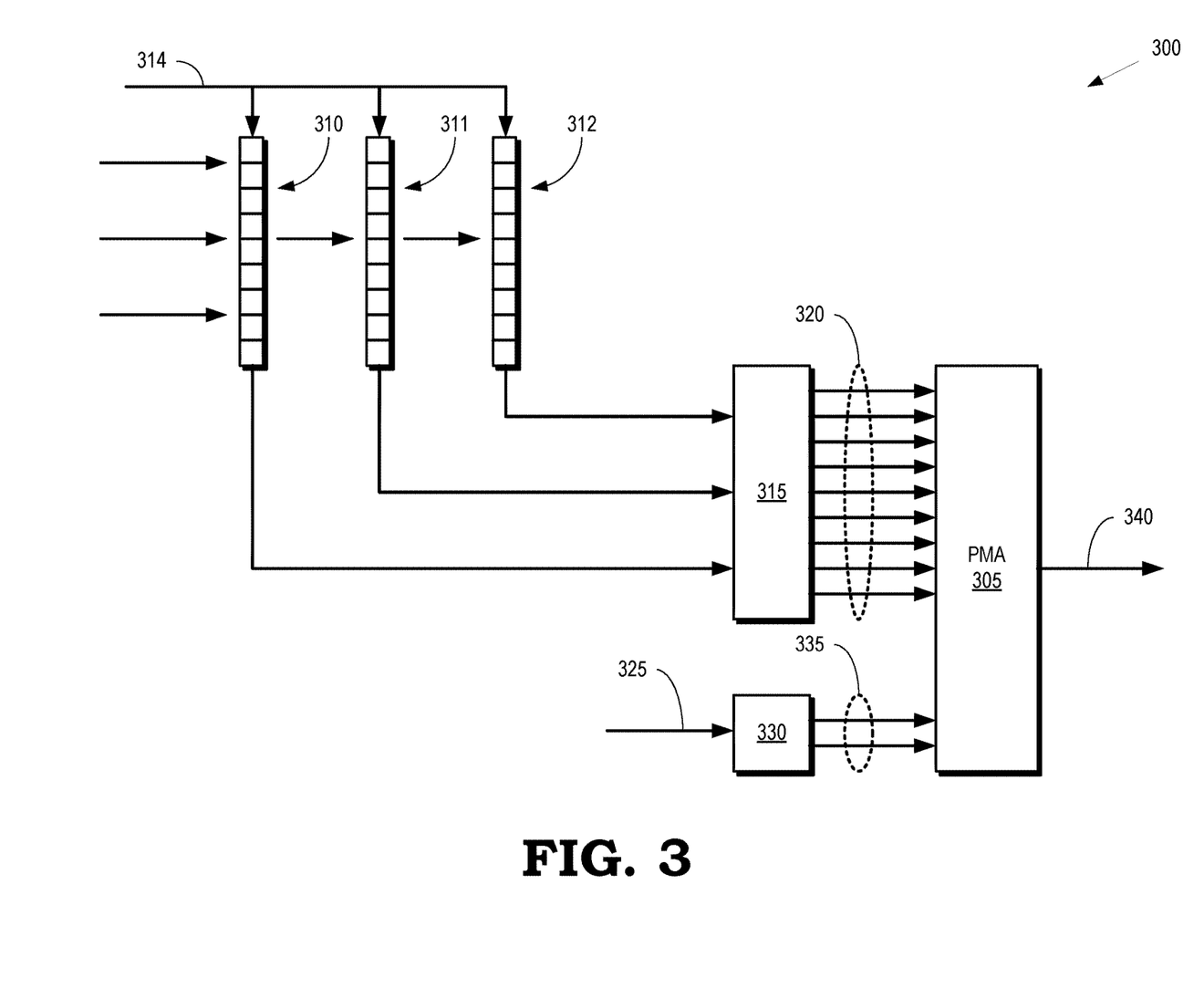
FIG. 3 is a block diagram of a circuit including a power management advisor according to some embodiments.

FIG. 3 is a block diagram of a circuit 300 including a power management advisor 305 according to some embodiments. The power management advisor 305 is used to implement some embodiments of the PMA 160, 165 shown in FIG. 1 and the global power management advisor 210 shown in FIG. 2. Some embodiments of the power management advisor 305 implement a neural network such as a convolutional neural network (CNN), as discussed below.

The circuit 300 includes a set of registers 310, 311, 312, which are referred to collectively herein as "the registers 310-312." Each of the registers 310-312 store state information for a corresponding power state of a processing unit. The register 310 store state information for the current power state of the processing unit, the register 311 stores state information for a previous power state of the processing unit, and the register 312 stores state information for another previous power state of the processing unit that is prior to the previous power state corresponding to the state information stored in the register 311. The state information stored in the registers 310-312 include values of performance counters associated with the current power state of the processing unit, inputs to a corresponding local power management controller, information indicating the subsequent power state selected by the power management controller, a value of the advice generated by the power management advisor 305, application hints related to energy, power, and performance, and the like. Although three registers 310-312 are shown in FIG. 3, some embodiments of the circuit 300 include more or fewer registers that are used to store more or fewer sets of state information for the corresponding processing unit.

The performance counters stored in the registers 310-312 are implemented in hardware blocks in the processing unit associated with the power management advisor 305. In some embodiments, values of the performance counters from blocks that consume relatively large amounts of power are stored in the registers 310-312. For example, the registers 310-312 can store values of performance counters from a shader array, a texture cache hierarchy, DRAM, and the like. The performance counters are used as features that are input to the power management advisor 305 and the values are used as training samples for neural networks that are implemented in the power management advisor 305. During neural network inferencing or during a prediction stage of the neural network, current values of the performance counters are used as input into the neural network. The performance counters provide information indicating system-level conditions and performance. For example, performance counters that monitor the draw packets in the processing unit input command buffer can influence the power state decision. If the performance counters indicate many draw packets, then the power state should not change to a lower power state. The processing unit will need to be in a higher power state to process the draw packets. This performance counter information is not available to local performance management controllers.

The state information stored in the registers 310-312 is updated in response to an update signal 314. In some embodiments, the update signal 314 triggers an update of the registers 310-312 in response to a power state transition. Updating the registers 310-312 includes shifting information out of the registers 310-312 and into registers that represent the next prior state. For example, the state information in the register 310 is shifted into the register 311, the state information in the register 311 is shifted into the register 312, and the state information in the register 312 is deleted or shifted into another register (not shown in FIG. 3). State information for the "new" current state, i.e., the state of the processing unit following the power state transition that triggered the update signal 314, is stored in the register 310.

State information in the registers 310-312 is provided to input vector circuitry 315, which generates an input vector 320 based on the provided state information. The input vector 320 represents a state history of the processing unit because it includes state information from a sequence of power states of the processing unit at a corresponding sequence of time intervals. Some embodiments of the input vector circuitry 315 generate the input vector 320 by concatenating values of the state information stored in the registers 310-312. However, other embodiments of the input vector circuitry 315 generate the input vector 320 using various combinations of the state information stored in the registers 310-312. The input vector 320 is provided to the power management advisor 305.

Information 325 representing a calculated effectiveness of a previous state transition is provided to training label circuitry 330, which generates labels 335 indicating whether the previous state transition was effective. Some embodiments of the labels 335 include labels indicating whether the previous state transition resulted in a target outcome such as a performance gain, reduced energy usage, a combination thereof, or other outcome. The training label circuitry 330 provides the labels 335 to the power management advisor 305, which uses the labels 335 in conjunction with the input vector 320 to determine probabilities that different power state transitions will result in the target outcome. As discussed herein, some embodiments of the power management advisor 305 are implemented as a neural network of reinforcement learning structures. Examples of neural networks than are implemented in the power management advisor 205 include, but are not limited to, recurrent neural networks or residual neural networks. The neural network learns patterns of power state transitions and probabilities that the patterns result in target outcomes. The power management advisor 305 is therefore able to generate signals 340 that represent the probabilities of achieving the target outcome by comparing the state history represented by the input 320 to the learned patterns. Training of the neural network is performed using a training dataset, feedback of the signal 340 generated by the power management advisor 305, or a combination thereof.

Figure 4:
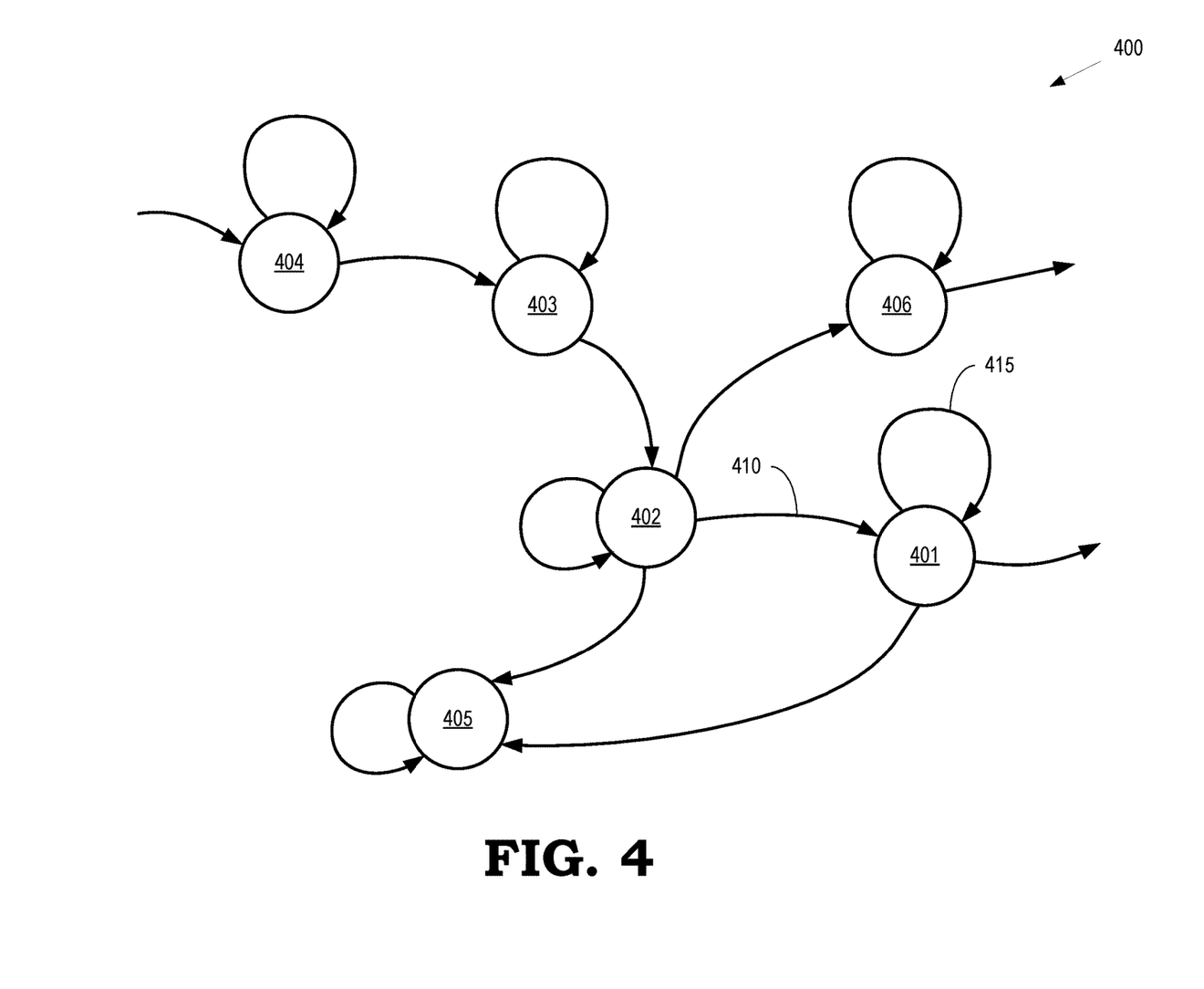
FIG. 4 is a state diagram illustrating a sequence of states of a processing unit according to some embodiments.

FIG. 4 is a state diagram 400 illustrating a sequence of states of a processing unit according to some embodiments. The state diagram 400 represents states of some embodiments of the GPU 115 or the CPU 130 shown in FIG. 1. The state diagram 400 illustrates a current state 401, a previous state 402, a prior previous state 403, a further prior previous state 404, and other states 405, 406, which are collectively referred to herein as "the states 401-406." The state diagram 400 illustrates transitions between the states such as the transition 410 from the previous state 402 to the current state 401. Transitions that return the processing unit to its current state 401, such as the transition 415, are also illustrated in FIG. 4. The states 401-406 are characterized by values of performance counters and other state information, as discussed herein. The states 401-406 are also associated with controls such as clock speed, voltage, frequency, and the like. Thus, transitions such as the transition 410 may cause a change in the controlling signals to change the clock speed, voltage, frequency, other parameter values, or combinations thereof. In some embodiments, state information characterizes multiple domains of the processing unit such as clock speed domains, frequency/voltage domains, power domains, and the like.

A power management controller such as the PMC 150, 155 shown in FIG. 1 or the local power management controller 205 shown in FIG. 2 predicts transitions between the states 401-406 using local information. For example, the power management controller can implement a Markov chain model to predict probabilities of power state transitions. A Markov chain is a stochastic model describing a sequence of possible events in which the probability of each event depends only on the state attained in the previous events. The events are states of the hardware blocks of a chip (such as the GPU 115 or CPU 130 shown in FIG. 1) or other entity associated with the power management controller. The power management controller creates a Markov chain model such that a subsequent state is predicted by a current state 401 and a set of probabilities of a transition from the current state 401 to a subsequent state. The predictions (e.g., the probabilities) of state transitions are updated at runtime.

Figure 5:
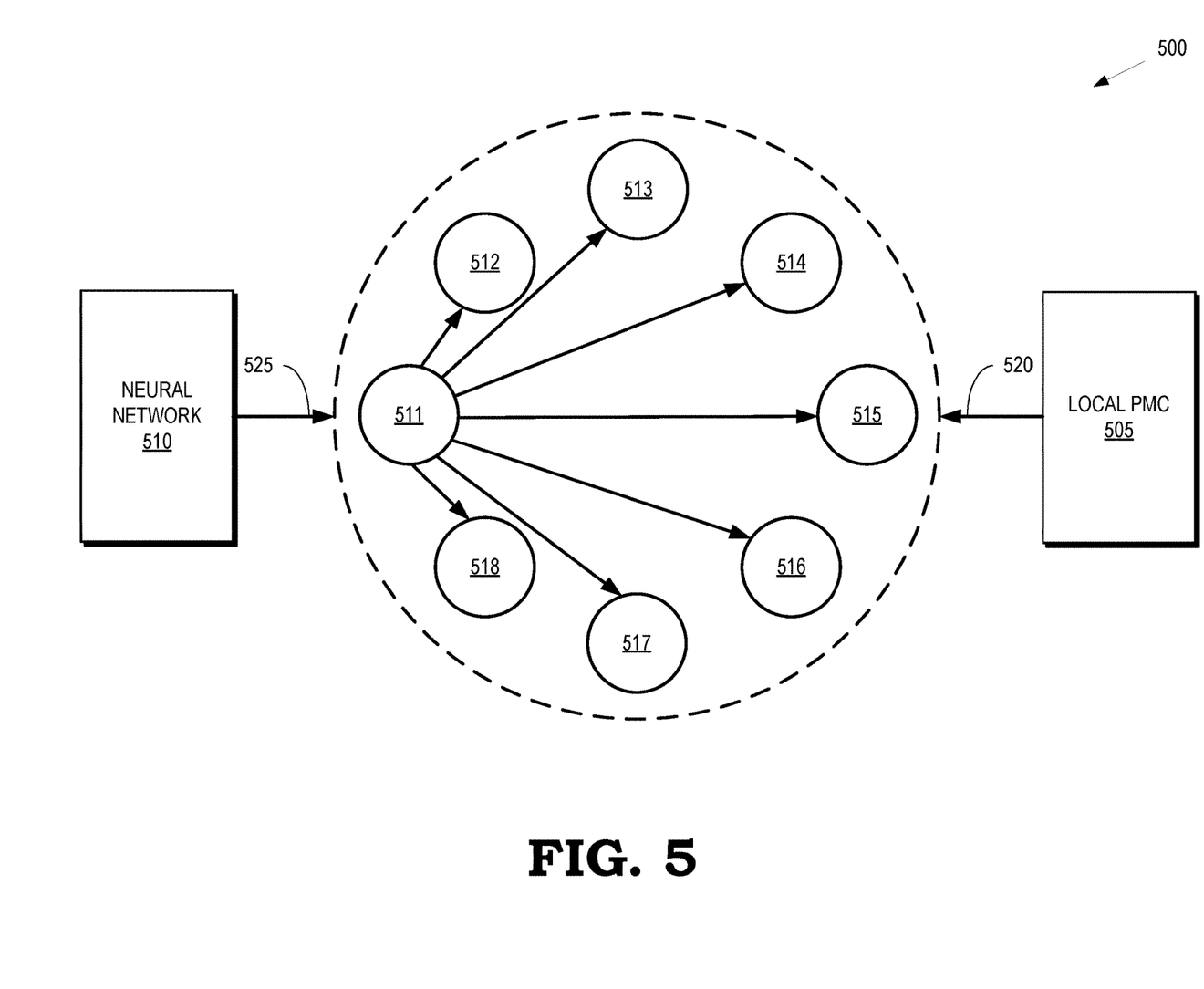
FIG. 5 is a block diagram of a power management control system according to some embodiments.

FIG. 5 is a block diagram of a power management control system 500 according to some embodiments. The power management control system 500 is implemented in some embodiments of the processing system 100 shown in FIG. 1. The power management control system 500 includes a local power management controller 505 and a power management advisor that is implemented using a neural network 510. The local power management controller 505 is used to implement some embodiments of the PMC 150, 155 shown in FIG. 1 and the local power management controller 205 shown in FIG. 2. The neural network 510 is used to implement some embodiments of the PMA 160, 165 shown in FIG. 1, the global power management advisor 210 shown in FIG. 2, and the PMA 305 shown in FIG. 3. A processing unit that implements the power management control system 500 has eight available power states 511, 512, 513, 514, 515, 516, 517, 518, which are collectively referred to herein as "the power states 511-518."

The power management controller 505 generates a prediction 520 that includes probabilities of state transitions between the power states 511-518 based on local state information for the current power state, which in the illustrated embodiment is the power state 511. In some embodiments, the power management controller 505 generates the prediction 520 using Markov chain state transition probabilities (X[0 ... N−1]) from the current state 511 to the available power states 511-518 of the processing unit. The value of N is the number of power states such as the eight power states available in some GPU implementations.

The neural network 510 generates advice 525 that represents probabilities of transitions to a subsequent state. For example, the probabilities can be represented as:

$$P_{NN}[0 \ldots N-1] = f_{NN}(A, M, S)$$

where N is the number of power states, S represents the state of the processing unit in the current power state and one or more previous power state of the processing unit, M represents machine state indicated by current and previous values of performance counters, and A represents current and previous application information such as a type of application (e.g., graphics or compute), command hints in one or more command buffers (which can be passed down by a corresponding driver), shader instructions inside an instruction queue, and the like. The advice 525 generated by the neural network 510 is therefore a function of the state history of the processing unit, as well as global parameters of the processing units such as performance counters, as discussed herein.

The total probabilities of transitions between the power states 511-518 are formed by combining the probabilities X (as generated by the power management controller 505 using the conventional Markov chain) and $P_{NN}$ (as generated by the neural network 510 based on the state history). Probabilities of state transitions generated by the power management controller 505 using local and global information are represented as:

$$P_T[0 \ldots N-1] = f(X[0 \ldots N-1], A, M, S)$$

In some embodiments, the probabilities are combined with equal weights, e.g., the total probabilities equal to an average of the probabilities P and $P_{NN}$. In some embodiments, different weights are applied to the probabilities P and $P_{NN}$ such as weights that are predicted using a state machine implemented in the power management system 500.

Figure 6:
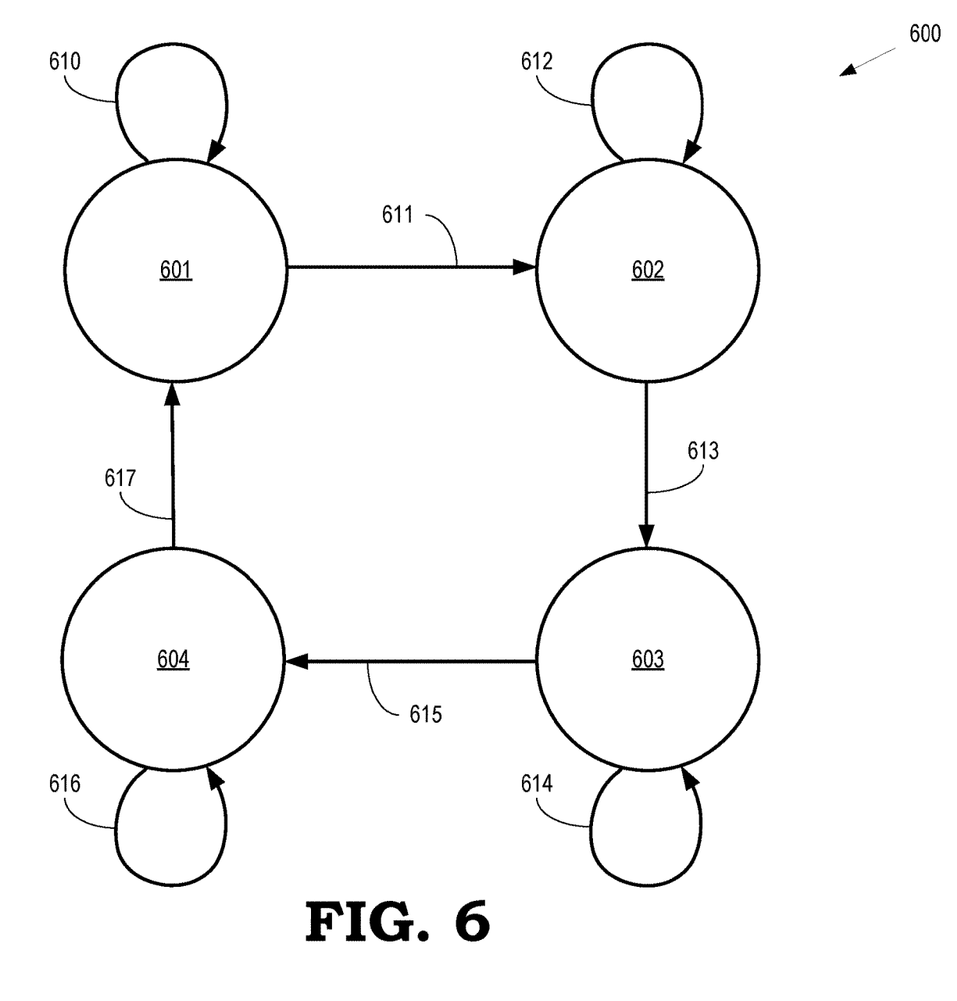
FIG. 6 is a block diagram of a state machine that determines weights applied to according to some embodiments.

FIG. 6 is a block diagram of a state machine 600 that determines weights applied to according to some embodiments. The state machine 600 is implemented in some embodiments of the PMA 160, 165 shown in FIG. 1, the global power management advisor 210 shown in FIG. 2, the PMA 305 shown in FIG. 3, or the neural network 510 shown in FIG. 5. The state machine 600 has four states 601, 602, 603, 604, which are collectively referred to herein as "the states 601-604." The state 601 is associated with a first weight that has a value of 1 that is applied to the prediction generated by the local power management controller (e.g., the Markov chain probabilities X[0 ... N−1]) and a second weight that has a value of 0 that is applied to the advice generated by the global power management advisor (e.g., the probabilities $P_{NN}$ generated by the neural network 510 based on the state history). In the state 602, the first weight has a value of 0.5 that is applied to the prediction generated by the local power management controller and the second weight has a value of 0.5 that is applied to the advice generated by the global power management advisor. In the state 603, the first weight has a value of 0 and the second weight has a value of 1. In the state 604, the first weight has a value of 0.5 and the second weight has a value of 0.5.

Transitions between the states 601-604 are determined based on whether a target outcome was achieved in a previous state transition. For example, the target outcome is achieved if a performance gain or a power savings increases by an amount that outweighs the cost of the power state transition. The target outcome is not achieved if the performance gain or the power savings does not outweigh the cost of the power state transition. The state machine 600 remains in the state 601 if the target outcome is achieved, as indicated by the transition 610. The state machine 600 transitions from the state 601 to the state 602 if the target outcome is not achieved, as indicated by the transition 611. The state machine 600 remains in the state 602 if the target outcome is achieved, as indicated by the transition 612. The state machine 600 transitions from the state 602 to the state 603 if the target outcome is not achieved, as indicated by the transition 613. The state machine 600 remains in the state 603 if the target outcome is achieved, as indicated by the transition 614. The state machine 600 transitions from the state 603 to the state 604 if the target outcome is not achieved, as indicated by the transition 615. The state machine 600 remains in the state 604 if the target outcome is achieved, as indicated by the transition 616. The state machine 600 transitions from the state 601 to the state 601 if the target outcome is not achieved, as indicated by the transition 617.

The values of the weights defined by the states 601-604 are used to combine the probability P predicted by the local power management controller and the probability $P_{NN}$ in the advice generated by the global power management advisor. In some embodiments, the global power management advisor provides the weights to the local power management controller in conjunction with (or as part of) the advice. The local power management controller determines whether to initiate a power state transition by applying the weights to the probabilities. The total probabilities for transitions to the different power states is given by:

$$P_T=f(X[0 \ldots N-1], A, M, S)=W_0 \cdot P_{NN}+W_1 \cdot X$$

Some embodiments of the state machine 600 implement more or fewer states that represent different combinations of the weights applied to the probabilities generated by the local power management controller and the global power management advisor.

In some embodiments, the apparatus and techniques described above are implemented in a system comprising one or more integrated circuit (IC) devices (also referred to as integrated circuit packages or microchips), such as the power management systems described above with reference to FIGS. 1-6. Electronic design automation (EDA) and computer aided design (CAD) software tools may be used in the design and fabrication of these IC devices. These design tools typically are represented as one or more software programs. These software programs can manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above regarding specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the embodiments disclosed above may be altered or modified and all such variations are considered within the scope of the disclosed subject matter. Accordingly, the protection sought herein is as set forth in the claims below.

What is claimed is:

1. An apparatus comprising:
  a power management advisor circuit (PMAC) configured to:
    detect at least one prior state transition that occurred at a processing unit of the apparatus; and
    provide, based on at least one outcome of the at least one prior state transition with respect to one or more of performance gains or power savings of the processing unit corresponding to the at least one prior state transition, an indication of a probability that performance gains or power savings resulting from a power state transition of the processing unit exceed at least one cost of the power state transition; and
  a power management controller circuit configured to:
    receive a signal corresponding to the indication of the probability; and
    select a subsequent power state transition based on the probability, and the processing unit configured to transition to the subsequent power state transition selected by the power management controller circuit.

2. The apparatus of claim 1, further comprising a plurality of registers to store sets of state information that represent the at least one outcome of at least one prior state transition of a processing unit, wherein a first register of the plurality of registers stores a first set of state information that represents a current state of the processing unit and at least one second register of the plurality of registers stores at least one second set of state information that represents the at least one outcome of the at least one prior state transition of the processing unit.

3. The apparatus of claim 2, wherein the first set of state information is copied to the at least one second register in response to the processing unit transitioning to a new power state, and wherein a new set of state information corresponding to the new power state is stored in the first register in response to the processing unit transitioning to the new power state.

4. The apparatus of claim 2, wherein the sets of state information comprise at least one of a power state of the processing unit, values of performance counters implemented in the processing unit, characteristics of instructions or draw call commands that are queued for execution in the processing unit, input to the power management controller circuit that determines whether to initiate a power state transition of the processing unit, information indicating decisions made by the power management controller circuit, a type of an application executing on the processing unit, hints provided by the application, and signals generated by the PMAC.

5. The apparatus of claim 2, wherein the PMAC is configured to generate the indication by comparing the sets of state information in the plurality of registers with the at least one outcome of the at least one prior state transition of the processing unit.

6. The apparatus of claim 5, wherein the at least one cost of the power state transition comprises at least one of performance costs or increased energy usage resulting from the power state transition.

7. The apparatus of claim 6, wherein the at least one outcome of the at least one prior state transition indicates whether the one or more of the performance gains or power savings resulting from the at least one prior state transition exceeded corresponding performance costs or increases in energy use resulting from previous state transitions.

8. The apparatus of claim 1, wherein the PMAC comprises a neural network configured to generate probabilities that the performance gains or power savings resulting from the power state transition of the processing unit from a current power state to a plurality of available power states exceeds the at least one cost of the power state transition.

9. The apparatus of claim 1, further comprising:
a state machine configured to indicate weights that are applied to the indication provided by the PMAC and power state transition decisions made by the power management controller circuit to determine whether to initiate the power state transition of the processing unit.

10. The apparatus of claim 1, wherein the PMAC is configured to generate the indication based on the at least one prior state transition and at least one prior outcome indicating whether the at least one prior state transition resulted in at least one of:
a performance gain resulting from the at least one prior state transition exceeding a performance cost of the at least one prior state transition; or
a power savings resulting from the at least one prior state transition exceeding an energy usage increase due to the at least one prior state transition.

11. A method comprising:
detecting, at a power management advisor circuit (PMAC), at least one prior state transition at a processing unit and at least one outcome with respect to one or more of performance gains or power savings having occurred at the processing unit resulting from the at least one prior state transition;
providing, at the PMAC, an indication based on a first set of state information that represents a current state of the processing unit and at least one second set of state information that represents the at least one outcome, the indication indicating a probability that performance gains or power savings resulting from a power state transition of the processing unit exceed at least one cost of the power state transition;
responsive to receiving a signal corresponding to the indication of the probability, selecting, at a power management controller circuit, a subsequent power state transition based on the indication; and
transitioning, by the processing unit, to the subsequent power state transition selected by the power management controller circuit.

12. The method of claim 11, wherein the first set of state information and at least one second set of state information comprise at least one of a power state of the processing unit, values of performance counters implemented in the processing unit, characteristics of instructions or draw call commands that are queued for execution in the processing unit, input to the power management controller circuit, information indicating decisions made by the power management controller circuit, a type of an application executing on the processing unit, hints provided by the application, and signals generated by the PMAC.

13. The method of claim 11, further comprising:
generating a prediction of a subsequent power state following the power state transition of the processing unit based on inputs that represent a subset of the first set of state information.

14. The method of claim 13, further comprising:
receiving information that indicates weights that are applied to the indication and the prediction, and
applying the weights to the indication and the prediction to determine whether to initiate a power state transition of the processing unit.

15. A processing unit comprising:
a power management controller circuit to generate, based on input representing a current power state of the processing unit and from a plurality of available power states, a prediction of a subsequent power state following a power state transition of the processing unit from the current power state; and
a power management advisor circuit (PMAC) to:
detect at least one prior power state transition that occurred at the processing unit; and
generate an indication based on sets of state information that represent at least one outcome of the at least one prior power state transition of the processing unit, wherein the indication indicates a probability that performance gains or power savings resulting from a power state transition of the processing unit to the plurality of available power states exceeds at least one cost incurred by the power state transition; and wherein the power management controller circuit is further to transition the processing unit to the subsequent power state based on the prediction and the indication.

16. The processing unit of claim 15, further comprising:
a plurality of registers, wherein a first register of the plurality of registers stores a first set of state information that represents a current state of the processing unit and at least one second register of the plurality of registers stores at least one second set of state information that represents the at least one outcome of the at least one prior power state transition of the processing unit, and
wherein the PMAC accesses the first set of state information and the at least one second set of state information from the plurality of registers.

17. The processing unit of claim 16, wherein the first set of state information is copied to the at least one second register in response to the processing unit transitioning to the subsequent power state, and wherein a new set of state information corresponding to the subsequent power state is stored in the first register in response to the processing unit transitioning to the subsequent power state.

18. The processing unit of claim 15, wherein the sets of state information comprise at least one of a power state of the processing unit, values of performance counters implemented in the processing unit, characteristics of instructions or draw call commands that are queued for execution in the processing unit, the input to the power management controller circuit, information indicating decisions made by the power management controller circuit, a type of an application executing on the processing unit, hints provided by the application, and signals generated by the PMAC.

19. The processing unit of claim 15, wherein the PMAC comprises a neural network that generates probabilities that the performance gains or power savings resulting from a power state transition of the processing unit from a current power state to a plurality of available power states exceeds the at least one cost incurred by the power state transition.

20. The processing unit of claim 19, further comprising:
a state machine to indicate weights that are applied to the indication provided by the PMAC and power state transition decisions made by the power management controller circuit to determine whether to initiate the power state transition of the processing unit.

* * * * *